United States Patent Office 2,923,639
Patented Feb. 2, 1960

2,923,639

ASPHALTIC COMPOSITIONS

Clarence E. Wilkinson, Port Neches, Tex., assignor to Texaco Inc., a corporation of Delaware No Drawing. Application April 26, 1957
Serial No. 655,188

7 Claims. (Cl. 106—282)

This invention relates to novel highly filled asphaltic compositions and the production thereof. More specifically, it concerns readily sprayable filled asphaltic cutbacks in which fine asbestos fibers and fine mineral selected from the group consisting of mica, oyster shell and mixtures thereof constitutes the filler component, said component being in an amount from about above 30% to about 50% by weight of the composition.

The compositions of my invention are useful in forming protective and insulated coatings upon surfaces of metal tanks, metal pipes, metal roofs, wooden piles, etc. and are further useful as undercoats for automobiles.

The coatings are created by spraying the compositions upon the aforementioned surfaces and then subsequently curing said compositions by allowing evaporation of the thinner component.

Highly filled coatings are more durable than those containing less filler. At the same time they are more resistant to fire and slippage at high temperatures and more resistant to shatter at low temperatures than asphaltic products containing little or no filler.

Fine asbestos fiber has been found to be a partially satisfactory filler in asphalt coating compositions. By fine asbestos, I mean asbestos, which upon a sieve analysis of the given sample, will result in less than about 2% retained on a No. 12 screen, about 5 to 10% passing a No. 12 retained on a No. 20 screen, about 40 to 60% passing a No. 20 retained on a No. 70, and the remainder passing through a No. 70 screen. The preceding percentages are based on weight.

I have found, however, when fine asbestos fibers are used solely to fill, air blown asphalt having a softening point of the order of 120° F. to 190° F. ring and ball cutback with a light distillate thinner to a viscosity within the range of approximately 40 to 120 at 122° F. Saybolt Furol (S.F.), the resulting composition is unsprayable even at the higher temperatures, e.g. 140° F. using a conventional spraying apparatus when above about 30% by weight of the composition is fine asbestos. Furthermore, I have determined that when a mixture of fine asbestos and fine mineral are used in amounts about above 30% by weight, a fine asbestos content of about above 20% will also render filled cutback compositions unsprayable.

Since the contemplated coating compositions are to be used in covering metal and wood surfaces and these surfaces are often exposed to the hazards of atmospheric weathering, fire, etc. it is desirable to have a relatively high filler content, i.e. a filler content greater than about 30%. Further, since large surface areas are usually coated in particular coating operations, it is also desirable to have a composition which can be rapidly and economically applied, i.e. a composition which can be sprayed upon the desired surface at moderate temperatures e.g. 60° F. rather than being of a consistency which would necessitate application by a brush or trowel.

I have discovered that using as the filler component a mixture of fine asbestos fiber and fine mineral and maintaining asbestos fiber content below about 20%, a total mixed filler content of above about 30% to about 50% by weight may be incorporated in air blown asphalt (ring and ball (120–190° F.) cutback with thinner to a viscosity from 40 to 120 S.F. at 122° F. without reducing the resulting composition to a nonsprayable consistency. By fine mineral, I mean pulverized mica, oyster shell or mixtures thereof which will pass a No. 100 screen (U.S. Standard) in 100% quantities. These fine minerals, when incorporated with fine asbestos fibers in an asphalt cutback, allow the cutback to contain a greater quantity of total filler yet remain sprayable than when fine asbestos fiber is solely used. For example, the composition comprising 10% fine asbestos fiber, 15% fine oyster shell and 10% fine mica and 65% asphalt cutback (heretofore described) was one of the most fluid and easily sprayable compositions I created having a consistency (Clarvoe) of one second under a 75 gram rod load while the composition comprising 35% by weight of fine asbestos fiber and 65% by weight of the same cutback had a consistency (Clarvoe) of 15 seconds under a 425 gram rod load and could not be handled at a temperature of 60° F. by a spray pump developing a maximum fluid line pressure of 320 p.s.i.

Mica and oyster shell have flat, plate-like shapes. They have been found particularly effective in aiding the fire resistance and durability of the coatings produced from my novel compositions. In contrast cubical shaped mineral particles, e.g. silica were found to impart no appreciable increase in the durability of the coatings. A further advantage of mica and oyster shell is their cost is substantially lower than the cost of fine asbestos fiber. Therefore, for a given filler content the compositions of my invention can be produced more cheaply than an asphalt cutback composition filled solely with fine asbestos fiber.

Specifically, I have found the following novel composition

| Components | Percent by weight |
|---|---|
| Air blown ashpalt (170–190° F. R. & B.) cutback to 40–120 S.F. at 122° F. with a light distillate. | between about 50–70%. |
| Fine asbestos fiber | between about 10–20%. |
| Fine mineral (100% passing a No. 100 screen; mica, oyster shell or mixtures thereof). | between about 10–40%. |
| Total filler content (Fine asbestos fiber and fine mineral). | between about 30–50%. | is sprayable at moderate atmospheric temperatures, e.g. 60° F. using a spray pump which develops a maximum fluid line pressure of 320 p.s.i. and produces a coating having superior fire resistance and durability properties. The coating neither deteriorates upon 12 months of atmospheric weathering nor does it blister, slip or crack.

Fine asbestos fiber in minimum quantities of about 10% by weight is necessary in my composition in order to prevent the resultant coating from sliding off metal particularly at elevated temperatures. Also, if fine mineral is used solely as the filler component, it will not impart a sufficient slippage resistant effect to the coating to prevent it from sliding off metal surfaces especially at temperatures of above about 140° F.

The data subsequently set forth in Tables I and II demonstrate the superiority of the novel composition. These tables show the effect of the type and quantity of filler on sprayability, durability and fire resistance. Table I concerns mixtures of fine asbestos and fine mineral while Table II deals with fine asbestos.

All the compositions were prepared by adding filler to the asphalt cutback (asphalt+distillate thinner) heated to 115° F. while stirring at 70 r.p.m. in a motor-driven mixer of the household variety. The mixture was stirred for 5 to 10 minutes after all the filler had been added. When two or more fillers were used, they were blended together before mixing with the asphalt cutback. However, these fillers may be mixed with the asphalt cutback alternately or simultaneously during the blending period.

Sieve analysis of the particular fine asbestos fiber used was found to give the following result.

| Screen | Percent by weight |
|---|---|
| Retained on No. 12 mesh | 0.1 |
| Passing No. 12 and retained on No. 20 | 6.7 |
| Passing No. 20 and retained on No. 40 | 38 |
| Passing No. 40 and retained on No. 70 | 15.1 |
| Passing No. 70 and retained on No. 140 | 7.1 |
| Passing No. 140 and retained on No. 200 | 4.2 |
| Passing No. 200 | 28.8 |

The particular thinner employed is straight run naphthenic distillate having a boiling range between 300–400° F. However, other light distillates may be used, e.g. kerosene and naphtha.

The following is a description of the various tests conducted on the compositions in Tables I and II.

(1) Penetration, plastic cone, 77° F.:

(a) *Description.*—This is an empirical estimation of consistency by measurement of the extent of penetration of a plastic cone into the material tested. The penetration figure is the depth of the plastic cone in tenths of millimeters. The higher the penetration values, the more fluid, i.e. the less stiff the composition.

(b) *Outline of method.*—The sample (filled cutback composition) is placed into a suitable container and adjusted to 77° F. The penetration is measured with the cone and the sample at this temperature using a penetrometer by means of which the cone is applied to the sample for 5 seconds under a load of 29± .1 gram.

(c) *Apparatus.*—

(1) Penetrometer as specified in ASTM method D-217.

(2) Plastic cone having the same dimensions as the aluminum cone described in ASTM method D-217 and weighing 29± 0.1 gram (including shaft).

(3) Constant temperature room or bath for maintaining temperature at 77° F.± 1° F.

(4) Sample containers—cylindrical, flat bottom, 3¾" in diameter by 2½" or more in depth.

*Table I*

| Composition, Wt. Percent | A | B | C | D | E | F | G | H | I |
|---|---|---|---|---|---|---|---|---|---|
| Air Blown Asphalt (softening point 180° F.) | 36.2 | 36.2 | 36.2 | 36.2 | 33.6 | 33.6 | 33.6 | 31 | 31 |
| Naphthenic Distillate, B.P. 300–400° F | 33.8 | 33.8 | 33.8 | 33.8 | 31.4 | 31.4 | 31.4 | 29 | 29 |
| Fine asbestos [1] | 20 | 20 | 20 | 15.0 | 17.5 | 15 | 10 | 20 | 20 |
| Oyster shell (100% past No. 100 screen) | 10 | | 5 | 5.0 | 17.5 | 10 | 15 | | 10 |
| Mica (100% passing No. 100 screen) | | 10 | 5 | 10.0 | | 10 | 10 | 20 | 10 |
| Tests: | | | | | | | | | |
| Penetration, Plastic Cone in 1/10 mm. at 77° F | 222 | 241 | 226 | 260 | 222 | 255 | 318 | 191 | 210 |
| Behavior at 140° F.— | | | | | | | | | |
| Metal 1. Slippage inches | None | None | None | None | None | None | None | None | None |
| Metal 2. Blisters | None | None | None | None | None | None | None | None | None |
| Behavior at 32° F | OK | OK | OK | OK | OK | OK | OK | OK | OK |
| Sprayability [2] | OK | OK | OK | OK | OK | OK | OK | [3] OK | OK |
| Atmospheric Weathering (12 Months) | OK | OK | OK | OK | OK | OK | OK | OK | OK |
| Fire Resistance, sec. (Flame duration) | 34 | 33 | | | | 15 | | 3 | 10 |

| Composition, Wt. Percent | J | K | L | M | N | O | P | Q |
|---|---|---|---|---|---|---|---|---|
| Air Blown Asphalt (softening point 180° F.) | 31 | 28.4 | 28.4 | 26 | 26 | 26 | 26 | 43.4 |
| Naphthenic Distillate, B.P. 300–400° F | 29 | 26.6 | 26.6 | 24 | 24 | 24 | 24 | 40.6 |
| Fine asbestos [1] | 20 | 15 | 10 | 15 | 10 | 20 | 20 | 4.0 |
| Oyster shell (100% past No. 100 screen) | 20 | 30 | 35 | 15 | 40 | | 30 | 12.0 |
| Mica (100% passing No. 100 screen) | | | | 20 | | 30 | | |
| Tests: | | | | | | | | |
| Penetration, Plastic Cone in 1/10 mm. at 77° F | 200 | 227 | 318 | 204 | 299 | 126 | 134 | greater than 360. |
| Behavior at 140° F.— | | | | | | | | |
| Metal 1. Slippage inches | None | None | None | None | None | None | None | coating slips off test panel. |
| Metal 2. Blisters | None | None | None | None | None | None | None | |
| Behavior at 32° F | OK | OK | OK | OK | OK | OK | OK | OK. |
| Sprayability [2] | [3] OK | OK | OK | [3] OK | OK | No | No | |
| Atmospheric Weathering (12 Months) | OK | OK | OK | OK | OK | OK | OK | |
| Fire Resistance, sec. (Flame duration) | 12 | | 7 | 8 | 5 | | | |

[1] Sieve Analysis, column 3.
[2] Spray pump operated at 60° F. developing a maximum pressure of 320 p.s.i. on the fluid line.
[3] Composition stiff but sprayable.

*Table II*

| Composition, Wt. Percent | A | B | C | D | E | F | G | H |
|---|---|---|---|---|---|---|---|---|
| Air Blown Asphalt (softening point 180° F., Ring and Ball) | 46.5 | 44.5 | 42.4 | 40.3 | 38.8 | 36.2 | 33.6 | 31.0 |
| Naphthenic Distillate, B.P. 300–400° F | 43.5 | 41.5 | 39.6 | 37.7 | 36.2 | 33.8 | 31.4 | 29.0 |
| Fine Asbestos [1] | 10.0 | 14.0 | 18.0 | 22.0 | 25.0 | 30.0 | 35.0 | 40.0 |
| Tests: | | | | | | | | |
| Penetration, Plastic Cone in 1/10 mm. at 77° F. | 354 | 325 | 283 | 246 | 203 | 168 | 120 | 76 |
| Behavior at 140° F.— | | | | | | | | |
| Metal 1. Slippage, inches | ⅝ | ⅛ | None | None | None | None | None | None. |
| Metal 2. Blisters | Slight | Slight | Trace | None | None | None | None | None. |
| Behavior at 32° F | OK | OK | OK | OK | OK | OK | OK | Fail (Severe Cracking). |
| Sprayability [2] | OK | OK | OK | OK | OK | No OK | No OK | No OK. |
| Atmospheric Weathering (2 Months) | OK | OK | OK | OK | OK | OK | OK | |
| Fire Resistance, sec. (Flame Duration) | | | 65 | | | 22 | | |

[1] Sieve Analysis, column 3.
[2] Spray pump operated at 60° F. developing a maximum pressure of 320 p.s.i. on the fluid line.

(d) *Preparation of sample and procedure.*—Maintain the sample in a closed sample container at 77° F. for 2 hours. Open the container and stir sample thoroughly but not vigorously. Place the can containing the sample on the Penetrometer table so that the tip of the plastic cone will be over the center of the sample and adjust apparatus until the tip of the cone just touches the surface of the sample. Release cone and shaft for 5 seconds and then record total penetration of the cone in tenths of millimeters for this period of time.

(2) Behavior at 140° F. and 32° F.:

(a) Tests are conducted in accordance with Federal Specifications SS-C-153 (U.S. Federal Specifications Board).

(b) E-5; behavior at 140° F. Spray the filled cutback composition on a metal test panel until a 1/16" to 1/8" coating is formed. Expose the coated panel for one hour in a well ventilated room and then suspend vertically in an oven for 5 hours at 140° F. Remove test panels from the oven and record blistering and slippage of coating, if any.

(c) E-6; behavior at 32° F. Expose the oven treated coated metal test panels from (b) to a temperature of 32° F. for one hour and then bend quickly over a mandrel 1" in diameter. Behavior is "OK" if coating does not crack and does not separate from the metal test panel.

(3) Atmospheric weathering: Exposure panels are prepared by spraying the filled cutback composition on 10" x 12" galvanized or black iron panels at the rate of approximately 5 gallons per 100 square feet (1/16 to 1/8 inch thick dry film). The panels are cured indoors for 3 to 7 days and then exposed outdoors on racks at an angle of 45 degrees facing south. Visual inspections are made periodically and the coatings are considered failed when approximately 25 percent of metal becomes exposed because of cracking, flaking or erosion.

(4) Fire resistance:

(a) Conducted according to Federal Specification TT-C-520, Sec. 3.3.7 and 4.3.13.

(b) A 1/16 inch dry film of coating is applied to metal test panel and air dried for 24 hours, baked for 16 hours at 170° F. and cooled to room temperature. The test panel is then suspended vertically in a shielded hood. A burner (Bunsen or Tirell) with air supply shut-off and the flame regulated to 2 inches is placed under the panel so that the lower end of panel is in the flame one inch. The flame is allowed to remain under the test panel for 20 seconds. After the flame is withdrawn, the time that flaming continues is recorded.

As can be seen from the preceding tables, my novel compositions combine sprayability with superior fire resistance as well as being resistant to atmospheric weathering, slippage and cracking. On the other hand, compositions containing asbestos only slip, blister and have relatively poor fire resistance at the lower filler contents and are correspondingly unsprayable and subject to cracking at the higher contents. Also, the inferiority of low mixed filler contents is demonstrated by Composition Q in Table I.

In the filled asphaltic cutback compositions of this invention there may be also incorporated 1 to 5% by weight tall oil in order to aid the adherence of the compositions and resultant coating to the sprayed surface particularly to aid adherence to wet metal surfaces. Tall oil is a product contained in paper manufacturing from pine wood. It is a material of somewhat complex composition and includes resins, acids, fatty acids and non-acidic constituents and includes sterols, high alcohols and other unsaponifiable matter. A typical composition of my invention containing oil is as follows:

| Component | Percent by weight |
|---|---|
| Air Blown asphalt (180° F. R. & B.) | 33.6 |
| Naphthenic Distillate (Boiling point 300-400° F.) | 28.3 |
| Fine Asbestos Fiber (Sieve Analysis, column 3.) | 17.5 |
| Oyster Shell (100% passing No. 100 screen) | 17.5 |
| Tall Oil | 3.1 |

Obviously, many modifications and variations of the invention, as hereinbefore set forth, may be made without departing from the spirit and scope thereof, and therefore only such limitations should be imposed as are indicated in the appended claims.

I claim:

1. A sprayable coating composition of vehicle and filler, said vehicle comprising from between about 50 and 70% by weight of the composition consisting essentially of air blown asphalt on the order of 120–190° F. ring and ball cutback with a light distillate to a viscosity within the range of 40–120 at 122° F. Saybolt Furol, said filler comprising between about 30 and 50% by weight of the composition and consisting essentially of a mixture of fine asbestos fibers and fine flat, plate-like mineral selected from the group consisting of mica, pulverized oyster shell and mixtures thereof, said asbestos in an amount between about 10 and 20% by weight of the composition, said mineral having a degree of fineness that will pass a No. 100 screen and constituting from about 10% to about 40% by weight of the composition, said composition being sprayable at moderate atmospheric temperatures under a maximum pressure of 320 p.s.i.

2. The composition as defined in claim 1, wherein said fine mineral is pulverized oyster shell.

3. A composition as defined in claim 1, wherein said fine mneral is mica.

4. The composition as defined in claim 1, wherein said fine mineral is a mixture of pulverized oyster shell and mica.

5. The composition as defined in claim 1, wherein the filler component consists of 10% asbestos, 15% pulverized oyster shell and 10% mica by weight of the composition.

6. A composition as defined in claim 1, including tall oil in an amount of 1 to 5% by weight of the composition.

7. The composition as defined in claim 6, wherein said fine mineral is pulverized oyster shell.

References Cited in the file of this patent

UNITED STATES PATENTS

| | | |
|---|---|---|
| 119,607 | Hawes | Oct. 3, 1871 |
| 295,604 | White | Mar. 25, 1884 |
| 1,901,792 | Zimmerman | Mar. 14, 1933 |
| 2,214,904 | Johnson | Sept. 17, 1940 |
| 2,418,135 | Moore | Apr. 1, 1947 |
| 2,546,659 | Sussenbach | Mar. 27, 1951 |
| 2,640,786 | Parsons | June 2, 1953 |
| 2,763,575 | Bede | Sept. 18, 1956 |
| 2,793,138 | Wilkinson | May 21, 1957 |

FOREIGN PATENTS

| | | |
|---|---|---|
| 160,033 | Austria | Jan. 10, 1941 |